PAUL E. QUENEAU
INVENTOR.

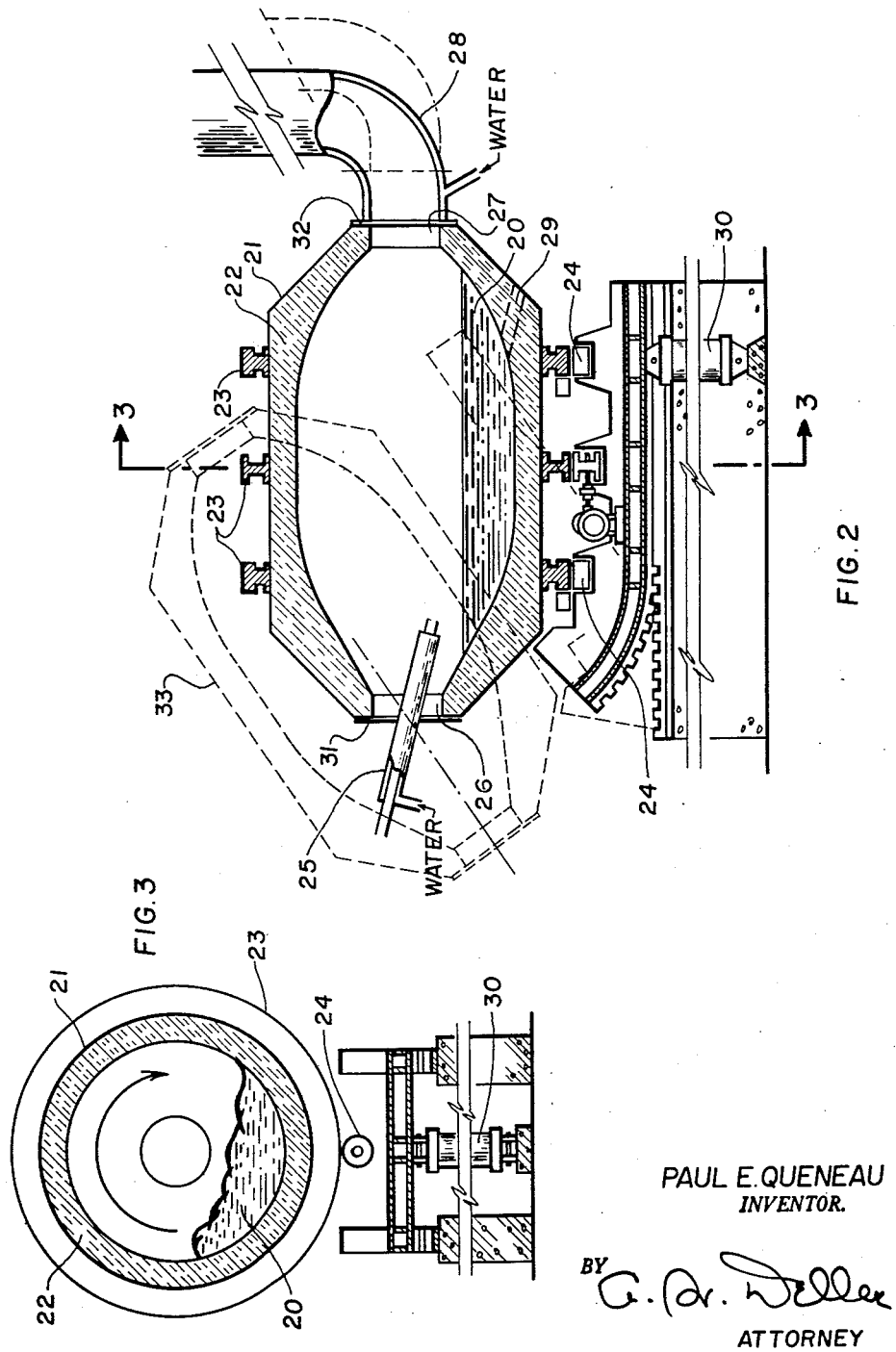

United States Patent Office 3,004,846
Patented Oct. 17, 1961

3,004,846
TREATMENT OF NICKEL-CONTAINING
SILICATE ORES
Paul Etienne Queneau, Fairfield, Conn., assignor to The
International Nickel Company, Inc., New York, N.Y.,
a corporation of Delaware
Filed Aug. 23, 1960, Ser. No. 51,418
7 Claims. (Cl. 75—21)

The present invention relates in general to an improved process for the treatment of lateritic nickel-containing ores and more particularly to a novel process for recovering nickel matte or metal from such ores.

This novel process is particularly adaptable to treating lateritic nickel ores of the silicate type found in many areas in the world such as those found in New Caledonia, the United States and Venezuela. The raw ore before processing contains considerable free and combined water. On a dry basis such ores normally analyze substantially less than 5% nickel, less than 0.10% cobalt and not more than 25% iron by weight. The hereindescribed novel process is adaptable, however, for any nickel-containing oxidic ores unsuitable for iron ore production, e.g., less than one-third by weight of iron. In referring to nickel hereinafter it is meant to include any cobalt present in the ore being treated.

Heretofore, in commercial practice such nickel-containing silicate ores have been treated pyrometallurgically by the Krupp-Renn and various electric smelting processes for the recovery of nickel in the form of a nickel-iron alloy or as impure metallic nickel by a relatively complex procedure including blast furnace, converter, roasting and reduction operations. The nickel-iron so produced is a relatively low-grade material sometimes containing less than 10% nickel and always containing more iron than nickel. Nickel-iron "luppen" obtained by the Krupp-Renn process contains less than 25% nickel, more than 0.25% sulfur, more than 0.25% carbon and the balance substantially all iron. In one of the electric smelting processes the ore is preheated and then melted in an electric furnace and the resulting molten material mixed with a bath of ferro-nickel and a reducing agent such as ferro-silicon. After dephosphorizing in a separate furnace, a marketable nickel-iron containing less than 50% nickel and relatively high in silicon is obtained. In another commercial process the ore is preheated and electric smelted using coke for reduction. The resulting crude nickel-iron product is desulfurized and then treated by conventional means in a Bessemer converter to eliminate impurities such as chromium, silicon, phosphorus and carbon. The nickel-iron so produced has a nickel content of only about 25%.

Nickel-containing lateritic ores have also been treated heretofore by sulfiding the contained nickel with a solid sulfiding agent. Thus, New Caledonia ores have been so treated for many years, the sulfide formed being processed for recovery of metallic nickel. Also, in what might be termed a modification of the Krupp-Renn process, it has been suggested that a solid sulfiding agent be added to the kiln feed so that matte rather than a nickel-iron alloy is obtained as a product. The nickel-bearing sulfide material so produced can then be recovered by conventional procedures such as flotation and magnetic separation.

Both of these concepts suffer considerably from relatively low nickel recovery, high solid fuel consumption and high cost of solid sulfiding agent.

It may now been discovered that lateritic nickel-containing ores may be processed economically and with high nickel recovery to a nickel-rich matte by a special high temperature selective reduction and sulfiding technique in a rotary kiln followed by smelting. This matte is advantageously then autogenously reduced directly to metallic nickel. In contradistinction to the aforementioned known techniques for sulfiding nickel-containing oxidic ores, my novel process, instead of using solid fuel reduction in a relatively non-selective manner and expensive solid sulfiding agent, relies on critically controlled, gaseous, high temperature, selective reduction and sulfiding of the ore in the solid state followed by smelting in such a manner as to yield high recovery of metallic nickel with regeneration of gaseous sulfiding agent.

It is an object of the present invention to provide a novel process for the treatment of silicate ores for recovery of the nickel contained therein.

Another object of the invention is to provide a method for recovering nickel from silicate ores by special smelting techniques.

The invention also contemplates providing a uniquely simple process for smelting lateritic nickel-containing ores for recovery of nickel metal substantially devoid of iron, sulfur, silicon, phosphorus, carbon and other impurities.

It is a further object of the invention to obtain substantially pure metallic nickel from this type of ore by economic pyrometallurgical techniques.

It is also the purpose of this invention to provide a process for treating oxide nickel ores by methods which can also be readily employed for the simultaneous smelting of sulfide nickel ores, thus allowing the construction of a versatile plant capable, for instance, of custom smelting operations.

It is a further object of the invention to provide a method of smelting silicate ores to a nickel-rich matte which can be treated for recovery of high purity metallic nickel and also for recovery of sulfur.

The invention further contemplates providing an economical process for directly obtaining good quality, metallic nickel suitable for most large tonnage commercial applications by smelting nickel-containing ores of both the oxide and sulfide types.

Other objects and advantages will become apparent from the following description taken in conjunction with the accompanying drawing in which:

FIGURE 2 depicts a longitudinal section through a rotary kiln-type furnace in which the deferrizing and desulfurizing of nickel sulfide, produced according to the hereindescribed process, to metallic nickel may be carried out; and FIGURE 3 shows a cross-section of the same furnace through line 3—3 of FIGURE 2.

Figure 1:
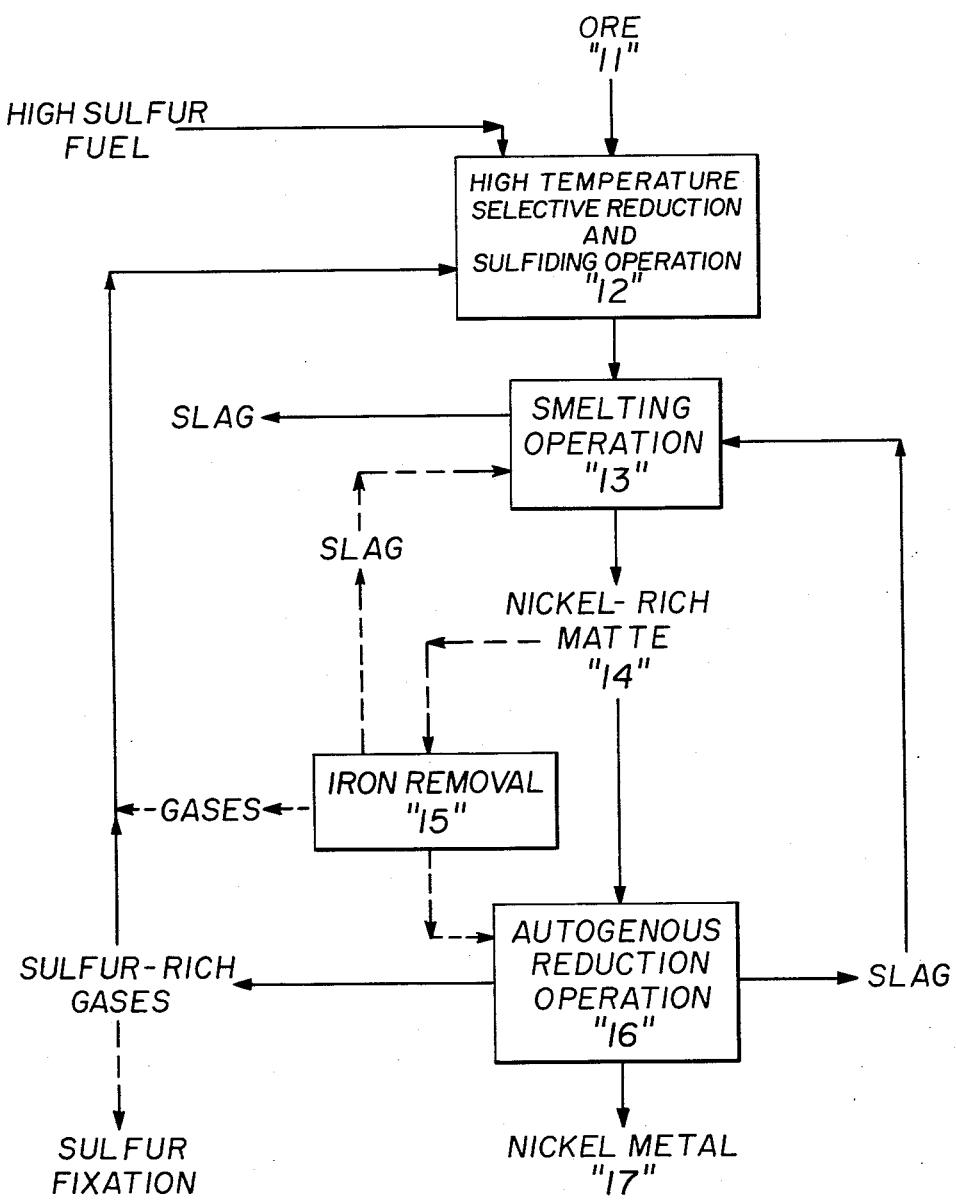
FIGURE 1 is a flow sheet illustrating a simplified embodiment of the process.

Generally speaking, the present invention contemplates treating lateritic nickel-containing ores for high nickel recovery by subjecting the comminuted or finely-divided ores to gaseous high temperature, selective reduction and sulfiding under controlled conditions of temperature and atmosphere. After the combined high temperature, selective reduction and controlled sulfiding the material being treated is smelted with flux, if desired, to form a nickel-rich sulfide matte. The nickel-rich matte may advantageously be autogenously reduced directly to metallic nickel or, if desired, treated conventionally for nickel recovery.

FIGURE 1 is a flow sheet illustrating a simplified embodiment of the process. Finely-divided lateritic, nickel-containing ore of the silicate type 11, which may be dried and/or comminuted, if necessary, is treated in operation 12 in a rotary kiln or other suitable vessel. Operation 12 consists of high temperature selective reduction and controlled sulfiding of the silicate type ore advantageously at a temperature of at least 1600° F. and below the incipient fusion temperature of the ore to reduce substantially all the nickel to metal while at the same time reducing advantageously not more than about twice as much iron as nickel to metal. The selectively reducing atmosphere used in the kiln contains sulfur obtained by burning a high sulfur fuel in the kiln and/or by passing gases containing sulfur dioxide which may be obtained from subsequent smelting operations, through the kiln. Thus, as the nickel and a small fraction of the iron in the ore are reduced to metal, at least all the metallic nickel is sulfided by the sulfur-containing gases in the kiln atmosphere and in the course of selective reduction the ore being treated is preheated, advantageously to as high as just below the incipient fusion temperature of the ore, prior to the subsequent smelting operation with a resultant advantageous reduction in heat requirements for said smelting operation.

The selectively reduced, sulfided and preheated material is smelted in smelting operation 13, advantageously in an electric furnace, to form a nickel-rich matte 14 from the sulfided material. The nickel-rich matte may advantageously then be treated in operation 16 in which the nickel matte is autogenously reduced by blowing directly to metallic nickel with oxygen by the novel process as described in the copending Queneau and Renzoni U.S. application Serial No. 51,438, filed August 23, 1960. The matte may also be treated for copper and cobalt removal by the technique as described in this patent application. Before converting the nickel-rich sulfide matte 14 in autogenous reduction operation 16 to nickel metal 17, it may, if desired, be processed for iron removal in separate operation 15 by blowing in a Bessemer converter to slag off the iron.

Any slag from the autogenous reduction operation 14 and from any necessary iron removal operation 15 is advantageously reverted to the smelting operation 13 for recovery of any nickel contained therein. The iron slag tends to reduce the melting point of the electric furnace slag. As also shown on the flow diagram, gases from the autogenous reduction operation 16 and from the iron elimination operation 15, if used, which are rich in sulfur dioxide are preferably directed through reducing operation 12 for sulfur fixation by sulfiding the ore. These gases may also be treated, as shown in FIGURE 1, for sulphur fixation.

In the high temperature, selective reduction and sulfiding operation 12 the finely-divided ore is treated, advantageously in a rotary kiln, at an elevated temperature in a controlled reducing and sulfiding atmosphere, formed by the partial combustion of relatively cheap fuels with a high sulfur content, e.g., containing 5% sulfur, and which may be supplemented by furnace gases containing substantial amounts of sulfur dioxide. These furnace gases may be reverted from subsequent smelting operations described hereinafter or may be led in from other plant smelting operations if available. The hot reducing and sulfiding gases are controlled so that substantially all the nickel in the ore is reduced to metal and sulfided while at the same time advantageously not more than about twice as much iron as nickel is reduced to metal. Normally I do not reduce more than about twice as much iron as nickel in that fuel consumption and reduction time increases as more iron is reduced and this iron and subsequently required flux is wasted as slag in the upgrading operation. Furthermore, the melting point of the high magnesia electric furnace slag is lower if a substantial ferrous oxide content is maintained. However, I desire to reduce as much iron as will allow substantially all the nickel to be reduced and recovered.

The reducing operation is conducted at a temperature of advantageously at least about 1600° F. and up to just below the incipient fusion temperature of the ore in a manner broadly similar to that described by the present inventor in U.S. Patent No. 2,850,376. In the process described in this patent, nickel-containing lateritic ores are treated in controlled reducing atmospheres so that in subsequent treatment with carbon monoxide substantially all the nickel and not more than about twice as much iron is volatilized as carbonyls. The gas ratios of the reduction operation are as described in U.S. Patent No. 2,850,376 and are based on the proportions of carbon monoxide and carbon dioxide in the atmosphere practically in equilibrium with the hot solid charge in the furnace at the final reaction temperature. The CO to $CO_2$ or $H_2$ to $H_2O$ ratios of the reducing atmospheres used in the process described in U.S. Patent No. 2,850,376 will, however, allow the reduction of more than twice as much iron as nickel to metal.

Although the high temperature, selective reducing and sulfiding operation is advantageously carried out in a rotating kiln, the operation may also be accomplished in other types of apparatus such as multi-hearth and fluid bed furnaces. I am interested in reducing substantially all the nickel and a small, controlled portion of the iron in the ore to the metal and at the same time sulfiding at least all the reduced nickel.

As stated herinbefore, the reducing operation is combined with a sulfiding one so that as the nickel and a small, controlled amount of iron are reduced to metal at least all the metallic nickel is sulfided by sulfur-containing gases in the kiln atmosphere and at the same time the ore is preheated so that heat requirements for subsequent smelting operations are substantially reduced. The sulfiding atmosphere formed by the burning of high sulfur fuel, may be supplemented as described hereinbefore, by sulfur-containing gases from the subsequent converting operation described hereinafter or from other plant operations, which gases are led into the reduction kiln. These gases may contain as high as 75% sulfur dioxide as well as small amounts of $SO_3$ and elemental sulfur. Advantageously, sulfiding of a minimum amount of iron is carried out in the reduction kiln, i.e., only that amount of iron is sulfided which will insure that substantially all the nickel and cobalt has been sulfided.

The preferentially reduced and sulfided ore is smelted to a fluid starte to form a relatively low melting point sulfide matte which collects at the bottom of the furnace. The matte contains substantially all of the nickel originally present in the ore along with iron reduced to metal. Because the required selective reduction of the ore has been fully accomplished outside the electric furnace there is an important saving in electrical energy. Thus, the only major heat requirements in the electric furnace are those for melting the ore which has advantageously been preheated during reduction to just below its incipient fusion point, i.e., no substantial ore agglomeration occurs, and by using relatively cheap, high sulfur fuel in the reducing operation considerable economies are realized over having to use frequently expensive, or hard to obtain, electrical energy. About one-third of the electrical power necessary for reduction and melting in an electric furnace may be saved by the hereindescribed novel critically controlled, combined, high temperature, selective reduction and sulfiding technique. Another important advantage of my technique of prior reduction of the ore outside the electric smelting furnace is that the ore is in a uniform condition on being charged to the electric furnace with resulting advantages understood by those skilled in the art. My prereduction technique also eliminates addition of carbon to the electric furnace which can cause difficulties due to blowing and boiling from generation of large volumes of gas or due to excessive iron reduction.

An "electrodes-in-line" rectangular, electric melting furnace instead of an "electrodes-in-triangle" circular electric furnace can be employed in that the heat requirements for melting the ore are relatively low. By using a rectangular furnace, ore transfer from kiln to furnace is simplified by reason of easier feeding such as by fettling along the side walls of the furnace to permit rapid and direct movement of hot, selectively reduced and sulfided ore from kiln to furnace with minimum loss of temperature and minimum dusting and to protect refractories. Inert gas such as waste nitrogen from oxygen generation may be employed to prevent reoxidation of the ore during transfer.

The slag formed in the smelting operation contains the unreduced iron, the magnesia, the alumina, the silica and other gangue constituents of the ore. Nickel-bearing slag from the subsequent autogenous reduction furnace or other nickel refining operation is reverted to the electric furnace for recovery of the nickel contained therein. This iron oxide-containing slag has the effect of reducing the melting point of the electric furnace slag.

The matte is tapped from the smelting process and is advantageously treated for recovery of metallic nickel in a furnace by a novel autogenous reduction operation 16.

The autogenous reduction operation employing commercial oxygen may be carried out in the furnace depicted in FIGURE 2 and FIGURE 3 of the accompanying drawing which show a longitudinal section of the furnace and a cross-section of the furnace through line 3—3 of FIGURE 2, respectively. Referring to FIGURES 2 and 3, the matte 20 is treated in the rotary kiln-type furnace 21 which is lined with refractory brick 22. The furnace may be tilted as desired for tapping by using tilting mechanism 30. The furnace has tires or drive rims 23 affixed circumferentially around it and these tires rest on supporting or drive wheels 24. Gas is supplied by a water-cooled tube or pipe 25 which projects through seal 31 and opening 26 into the furnace. Exhaust gases pass out of opening 27 at the other end of the furnace into the flue 28 which may be water-cooled and which may be swung away from the kiln opening to allow charging of fresh sulfide, flux or other materials through opening 27. Seal 32 provides a gas-tight contact between the kiln and flue 28. Slag may be withdrawn by tilting the furnace and tapping from the top of the molten bath. At the completion of the blow, molten metallic nickel is tapped by tilting the furnace into the position shown by 33 in FIGURE 2 or is optionally withdrawn through taphole 29.

The autogenous reduction operation need not be carried out in the apparatus as specifically shown in the accompanying drawing and described hereinbefore but may take place in a conventional top blown converter as long as a sufficiently high degree of agitation to provide efficient and effective gas-solid-liquid contact throughout the bath, which is conducive to efficient elimination of iron, sulfur and impurities, is attained. I employ mechanical means, which is independent of gases introduced into the furnace, for bath agitation to insure the efficient and effective gas-liquid-solid contact throughout the bath.

In the autogenous reduction furnace the nickel matte is blown down to less than about 0.05% sulfur, e.g., about 0.01% sulfur. It will be understood, of course, that if desired, conventional desulfurizing techniques may be employed for final desulfurization. This matte refining technique is also advantageous over ferro-nickel techniques because of high nickel recovery combined with the ease of refining matte to good quality nickel as compared to the refining of low-grade ferro-nickel. Another advantage of this novel autogenous reduction technique for treating the nickel matte over other processes for recovering nickel from this type of ore is that its cobalt may be decreased down to a desired level by blowing the matte while maintaining a certain sulfur content as described in the copending Queneau and Renzoni U.S. application Serial No. 51,438, filed August 23, 1960.

Iron may be slagged off at the beginning of the blow in the autogenous reduction furnace by addition of silica flux. Removal of iron is accompanied by the removal of other impurities which are oxidized and blown or slagged off during the blow. The slag formed is reverted to the electric smelting furnace for recovery of its nickel content and to reduce the melting point of the electric furnace slag. Advantagueously, the slag produced during the first part of the blow is reverted to the smelting furnace and the slag produced during the last part of the blow is retained in the top blown furnace for reduction of its nickel content during the first part of the next blowing cycle. Iron removal by slagging may be accomplished, if desired, by operation 15 in a separate converter before the matte is blown in the autogenous reduction operation. Slag formed in operation 15 is advantageously reverted to the electric furnace in the same manner as the autogenous reduction furnace slag.

In this novel, autogenous reduction operation molten matte is treated by bringing commercial oxygen into direct contact with its surface. The oxygen is top blown onto the molten material which is maintained in a state of turbulence by mechanical means independent of the gases introduced into the furnace. Thus, complete uniformity is maintained throughout the bath to provide effective gas-liquid-solid contact and rapidly establish equilibrium conditions.

As sulfur elimination of the bath proceeds, the temperature of the bath is gradually raised until its sulfur content has been lowered to less than 4% and a bath temperature of above about 2800° F. has been attained. When desulfurization has proceeded to this point the oxidizing gases are replaced by neutral or reducing gases, which are substantially free of sulfur dioxide, while heating the molten bath to above 2900° F. but below 3200° F. To maintain this temperature the neutral or reducing gases must be heated to a high temperature and this is most readily accomplished by using a highly combustible fuel such as natural gas in combination with an oxygen-containing gas. This non-oxidizing, sulfur-free, high temperature injected atmosphere permits rapid and complete reaction between nickel oxide and nickel sulfide, thus eliminating both by formation of metallic nickel and sulfur dioxide.

In this final desulfurizing step, sulfur elimination down to less than 0.05% in the nickel product is attained. This novel autogenous reduction technique enables one to blow large tonnages of nickel matte in a single, simple and cheap operation directly to good quality nickel low in sulfur, e.g., 0.01% sulfur.

Sulfur-containing gases from the autogenous reduction operation 16 and any iron removal operation 15 are advantageously led off and passed through selective reduction operation 12 to aid in the sulfiding of the metallic material formed during the preferential reduction.

It can be seen that by this special high temperature, selective reducing and sulfiding technique with reversion of sulfur-containing gases from the autogenous reduction operation the need for supplying expensive sulfur, such as by the reduction of calcium sulfate or as iron sulfide or in elemental form, is eliminated. Thus, a high-sulfur fuel which is cheap compared to low sulfur fuels is used and the sulfur for the hereindescribed novel process is, in effect, not only obtained free but also is supplied with a premium. This sulfur can be ultimately recovered by fixing the final sulfur fumes from the process as acid.

It is to be observed that the preheated, selectively reduced and critically sulfided ore from operation 12 may be subjected to separation operations to part the sulfide which has been formed from the unsulfided portions of the ore. Thus, the ore from operation 12 can, of course, be treated by a process in which the sulfided ore is fused in a rotary kiln. The so-treated product may then be comminuted and subjected to flotation and/or magnetic separation to recover the sulfided material which is then further treated for nickel recovery.

For the purpose of giving those skilled in the art a better understanding of the invention, the following illustrative example is given:

A lateritic nickel ore of the silicate type containing 2.9% nickel and 15% iron was treated at 1600° F. for two hours in an atmosphere of carbon monoxide, carbon dioxide, hydrogen and water vapor, in which the ratio of $CO:CO_2$ was equal to 1:1, to selectively reduce nickel and a small part of the iron to metal. The reducing atmosphere also contained 0.7% by volume of sulfur dioxide which was fixed in the solids charge and converted all the nickel therein to sulfide. The hot, reduced and sulfided charge was then smelted at 2800° F. to a matte containing 30.3% nickel, 46.5% iron and the balance sulfur. The nickel in the matte represented 98% of the total in the ore.

It is to be observed that the present process provides a unique method for the direct recovery of nickel from its oxide ores by using pyrometallurgical techniques to form nickel sulfide, which can be treated by the process as described by the present invention in U.S. Patent No. 2,944,883 or which can be cast into anodes and treated electrolytically for pure nickel and pure sulfur recovery, as described in U.S. Patent No. 2,839,461, or to form fire refined nickel or metallic nickel which can be refined electrolytically or by carbonyl procedures to pure nickel.

It is to be observed also that the present process has substantial advantages over those processes used heretofore in the art for treating nickel-containing oxide ores for nickel recovery, including those relatively complex processes in which sulfiding techniques have been employed. Thus, the present process has better heat economy due to controlled, high temperature, selective reduction of the ore prior to smelting. Furthermore, the novel sulfiding technique used results in excellent sulfur economy. At the same time, the hereindescribed process allows high metal recovery and produces metallic nickel directly. Also, the present process is a single integrated operation in which the ore is processed to obtain metallic nickel for market in just three steps, i.e., controlled, high temperature, selective reduction and sulfiding, smelting and autogenous reduction.

This application is a continuation-in-part of my copending U.S. application Serial No. 839,430, filed September 11, 1959, now abandoned.

Although the present invention has been described in conjunction with preferred embodiments, it is to be understood that modifications and variations may be resorted to without departing from the spirit and scope of the invention, as those skilled in the art will readily understand. For instance, sulfiding of the selectively reduced ore may be accomplished by means other than those hereinbefore described. Such modifications and variations are considered to be within the purview and scope of the invention and appended claims.

I claim:

1. A process for recovering nickel from oxide nickel ores which comprises treating said ore in a finely-divided state at elevated temperatures with a mixture of controlled, selective reducing and sulfur-containing gases to reduce substantially all of the nickel and a small, controlled portion of the iron contained in said ore and to sulfide at least substantially all the nickel; smelting said reduced and sulfided ore in a smelting furnace to form a sulfide matte from the reduced and sulfided material in said ore; and treating said matte for recovery of the nickel contained therein.

2. A process as described in claim 1 in which the ore is treated with a mixture of controlled, selective reducing and sulfur-containing gases at a temperature of at least about 1600° F., and below the incipient fusion temperature of the ore.

3. A process for recovering nickel from nickel-containing lateritic ores of the silicate type containing less than 5% nickel, less than 0.10% cobalt and less than one-third iron by weight which comprises comminuting said ore to a fine particle size treating said ore at a temperature of at least 1600° F. and below the incipient fusion temperature of the ore with a mixture of controlled, selective reducing and sulfur-containing gases to reduce substantially all the nickel and not more than about twice as much iron to metal, and to sulfide at least substantially all the nickel; smelting said reduced and sulfided ore to form a molten sulfide matte from the reduced and sulfided material in said ore; blowing said molten matte to remove iron and cobalt contained therein as slag; and autogenously reducing said matte by top blowing with oxygen to eliminate the sulfur and obtain metallic nickel substantially free of iron.

4. A process for recovering nickel from nickel-containing lateritic ores of the silicate type containing less than 5% nickel, less than 0.10% cobalt and less than one-third iron by weight which comprises comminuting said ore to a fine particle size treating said ore at a temperature of at least 1600° F. and below the incipient fusion temperature of the ore with a mixture of controlled, selective reducing and sulfur-containing gases, obtained by burning a high sulfur fuel and by mixing with the gases so-formed sulfur-containing furnace gases, said reducing gases being regulated to reduce substantially all the nickel and not more than about twice as much iron to metal, to reduce said amounts of nickel and iron to metal and to sulfide at least substantially all the nickel; smelting said reduced and sulfided ore to form a molten sulfide matte from the reduced and sulfided material in said ore; blowing said molten matte to remove iron and cobalt contained therein as slag; autogenously reducing said molten matte which is maintained in a state of agitation by mechanical means by top blowing with oxygen to eliminate the sulfur and obtain metallic nickel substantially free of iron; reverting slag from said blowing operations to said smelting operation for reduction of its nickel content; and reverting sulfur-containing gases from said blowing operations to said reducing and sulfiding step.

5. A process for recovering nickel from nickel-containing lateritic ores which comprises treating said ore in a finely-divided state at an elevated temperature but below the incipient fusion temperature of the ore with a mixture of selective reducing and sulfur-containing gases controlled to reduce substantially all the nickel and not more than about twice as much iron, and to sulfide at least substantially all the nickel; smelting said reduced and sulfided ore to form a molten sulfide matte from the reduced and sulfided material in said ore; blowing said molten matte with oxygen-containing gases to remove iron contained therein as slag; reverting slag from said blowing operation to said smelting operation for reduction of its nickel content; and treating said matte from which iron has been removed for recovery of the nickel contained therein.

6. A process as described in claim 5 in which the molten sulfide matte from which iron has been removed is autogenously reduced by blowing with oxygen to metallic nickel and sulfur-containing gases from said blowing operation are reverted to said reducing and sulfiding operation.

7. A process for recovering nickel from nickel-containing lateritic ores of the silicate type containing less than 5% nickel and less than one-third iron by weight which comprises treating said ore in a finely-divided state at a temperature of at least 1600° F. and below the incipient fusion temperature of the ore with a mixture of selective reducing and sulfur-containing gases regulated to reduce substantially all the nickel and not more than about twice as much iron to metal, to reduce said amounts of nickel and iron to metal and to sulfide at least substantially all the nickel; smelting said reduced and sulfided ore to form a molten sulfide matte from the reduced and sulfided material in said ore, blowing said molten matte to remove iron contained therein as slag; autogenously reducing said matte, which is maintained in a state of mechanically induced agitation, by top blowing with an oxygen-enriched blast to eliminate the sulfur and obtain metallic nickel substantially free of iron; reverting slag from said blowing operations to said smelting operation for reduction of its nickel content; and reverting sulfur-containing gases from said blowing operations to said reducing and sulfiding step.

No references cited.

UNITED STATES PATENT OFFICE
CERTIFICATION OF CORRECTION

Patent No. 3,004,846                                        October 17, 1961

Paul Etienne Queneau

It is hereby certified that error appears in the above numbered patent requiring correction and that the said Letters Patent should read as corrected below.

In the heading to the drawings, Sheets 1 and 2, line 2, in the title of invention, for "NICKLE-" read -- NICKEL- --; column 1, line 37, for "contains" read -- contain --; line 68, for "may" read -- has --; column 4, line 19, for "herinbefore" read -- hereinbefore --; line 38, for "starte" read -- state --; column 5, line 73, for "Advantagueously" read -- Advantageously --; column 7, line 66, and column 8, line 8, after "size", each occurrence, insert a semicolon; same column 8, line 64, for "ore," read -- ore; --.

Signed and sealed this 3rd day of July 1962.

(SEAL)
Attest:

ERNEST W. SWIDER                                        DAVID L. LADD
Attesting Officer                                           Commissioner of Patents